(12) United States Patent
Sahami et al.

(10) Patent No.: US 8,484,192 B1
(45) Date of Patent: Jul. 9, 2013

(54) MEDIA SEARCH BROADENING

(75) Inventors: Mehran Sahami, Palo Alto, CA (US);
Richard C. Gossweiler, III, Sunnyvale, CA (US); Manish G. Patel, Mountain View, CA (US); John Blackburn, Newcastle, WA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 11/742,382

(22) Filed: Apr. 30, 2007

(51) Int. Cl.
*G06F 17/30* (2006.01)
*G06F 7/00* (2006.01)

(52) U.S. Cl.
USPC .......................... 707/708; 707/765; 707/913

(58) Field of Classification Search
USPC ......................................... 707/708, 765, 913
See application file for complete search history.

(56) References Cited

U.S. PATENT DOCUMENTS

| | | | |
|---|---|---|---|
| 4,963,995 A | 10/1990 | Lang | |
| 5,010,499 A | 4/1991 | Yee | |
| 5,121,476 A | 6/1992 | Yee | |
| 5,589,892 A | 12/1996 | Knee et al. | |
| 5,629,733 A | 5/1997 | Youman et al. | |
| 5,793,438 A | 8/1998 | Bedard | |
| 5,801,787 A | 9/1998 | Schein et al. | |
| 5,805,235 A | 9/1998 | Bedard | |
| 5,808,694 A | 9/1998 | Usui et al. | |
| 5,880,768 A | 3/1999 | Lammons et al. | |
| 5,903,816 A | 5/1999 | Broadwin et al. | |
| 5,940,073 A | 8/1999 | Klosterman et al. | |
| 6,002,394 A | 12/1999 | Schein et al. | |
| 6,005,562 A | 12/1999 | Shiga et al. | |
| 6,005,565 A | 12/1999 | Legall et al. | |
| 6,014,184 A | 1/2000 | Knee et al. | |
| 6,014,502 A | 1/2000 | Moraes | |
| 6,144,958 A * | 11/2000 | Ortega et al. ...................... 1/1 |
| 6,147,715 A | 11/2000 | Yuen et al. | |
| 6,216,264 B1 | 4/2001 | Maze et al. | |
| 6,233,389 B1 | 5/2001 | Barton et al. | |
| 6,263,501 B1 | 7/2001 | Schein et al. | |
| 6,268,849 B1 | 7/2001 | Boyer et al. | |
| 6,373,528 B1 | 4/2002 | Bennington et al. | |
| 6,483,548 B1 | 11/2002 | Allport | |
| 6,493,878 B1 | 12/2002 | Kassatly | |

(Continued)

FOREIGN PATENT DOCUMENTS

KR    10-2007-0027143    3/2007

OTHER PUBLICATIONS

Sahami, M., et al., "A web-based kernel function for measuring the similarity of short text snippets", Proceeding of the 15th International Conference on World Wide Web (WWW 2006), pp. 377-386.

(Continued)

*Primary Examiner* — Mariela Reyes
(74) *Attorney, Agent, or Firm* — Fish & Richardson P.C.

(57) ABSTRACT

A computer-implemented method includes receiving a search request at a central information provider, generating a query containing media-related terms relating to the search request, and submitting the query to a search engine having access to media-related search results, wherein the query is broader than the received search request, and transmitting media-related search results generated in response to the query by the search engine, to a remote device.

18 Claims, 12 Drawing Sheets

U.S. PATENT DOCUMENTS

| | | | |
|---|---|---|---|
| 6,505,348 B1 | 1/2003 | Knowles et al. | |
| 6,523,028 B1 * | 2/2003 | DiDomizio et al. | 707/748 |
| 6,640,337 B1 | 10/2003 | Lu | |
| 6,642,939 B1 | 11/2003 | Vallone et al. | |
| 6,769,128 B1 | 7/2004 | Knee et al. | |
| 7,065,709 B2 | 6/2006 | Ellis et al. | |
| 7,328,450 B2 | 2/2008 | Macrae et al. | |
| 7,493,015 B1 | 2/2009 | Van Stam et al. | |
| 7,606,925 B2 | 10/2009 | Sheldon | |
| 7,627,882 B2 | 12/2009 | Finseth et al. | |
| 7,685,119 B2 * | 3/2010 | Riise et al. | 707/999.005 |
| 7,685,619 B1 | 3/2010 | Herz | |
| 7,734,680 B1 | 6/2010 | Kurapati et al. | |
| 7,779,009 B2 * | 8/2010 | Chowdhury et al. | 707/737 |
| 2001/0001160 A1 | 5/2001 | Shoff et al. | |
| 2002/0083451 A1 | 6/2002 | Gill et al. | |
| 2002/0133821 A1 | 9/2002 | Shteyn | |
| 2003/0070171 A1 | 4/2003 | Jeon et al. | |
| 2003/0110503 A1 | 6/2003 | Perkes | |
| 2003/0126600 A1 | 7/2003 | Heuvelman | |
| 2003/0163828 A1 | 8/2003 | Agnihotri et al. | |
| 2003/0226147 A1 | 12/2003 | Richmond et al. | |
| 2004/0073922 A1 | 4/2004 | True | |
| 2004/0078816 A1 | 4/2004 | Johnson | |
| 2004/0088328 A1 * | 5/2004 | Cook et al. | 707/104.1 |
| 2004/0194141 A1 | 9/2004 | Sanders | |
| 2005/0102704 A1 | 5/2005 | Prokupets et al. | |
| 2006/0130093 A1 | 6/2006 | Feng et al. | |
| 2006/0136383 A1 | 6/2006 | Golla | |
| 2006/0195447 A1 | 8/2006 | Chang | |
| 2006/0230035 A1 | 10/2006 | Bailey et al. | |
| 2007/0214131 A1 | 9/2007 | Cucerzan et al. | |
| 2007/0214480 A1 | 9/2007 | Kamen | |
| 2008/0063381 A1 | 3/2008 | Conroy et al. | |
| 2008/0270449 A1 | 10/2008 | Gossweiler et al. | |
| 2008/0270886 A1 | 10/2008 | Gossweiler et al. | |
| 2008/0271078 A1 | 10/2008 | Gossweiler et al. | |
| 2008/0271080 A1 | 10/2008 | Gossweiler et al. | |
| 2009/0055385 A1 | 2/2009 | Jeon et al. | |

OTHER PUBLICATIONS

Al Zabir, Omar, "Build a Google I G like AJAX Start Page in 7 days using ASP.NET AJAX and .NET 3.0". codeproject.com [online]. [retrieved on May 21, 2010]. Retrieved from the Internet: <URL: http://www.codeproject.com/KB/ajax/MakingGoogleIG.aspx>, 31 pages.

International Preliminary Report on Patentability, International Application No. PCT/US2008/062075, dated Nov. 12, 2009, 6 pages.

International Search Report and Written Opinion for International Application No. PCT/US2008/062075, dated Oct. 21, 2008, 10 pages.

Non-Final Office Action from U.S. Appl. No. 11/742,258, dated Jun. 5, 2009, 14 pages.

Final Office Action from U.S. Appl. No. 11/742,258, dated Mar. 3, 2010, 18 pages.

Non-Final Office Action from U.S. Appl. No. 11/742,258, dated Jul. 20, 2010, 23 pages.

Final Office Action from U.S. Appl. No. 11/742,258, dated Dec. 15, 2010, 16 pages.

U.S. Appl. No. 12/938,725, filed Nov. 3, 2010, Managing Electronic Media Collections, Richard C. Gossweiler III.

U.S. Appl. No. 12/938,810, filed Nov. 3, 2010, Social Aspects of Media Guides, Richard C. Gossweiler III.

U.S. Appl. No. 12/938,834, filed Nov. 3, 2010, Media-Related Trends, Richard C. Gossweiler III.

Berniker. "TV guide going online," *Broadcasting and Cable*, 1994, 124(24):49.

"Lost—Infos, Episodenfuhrer, TV—Termine, DVDs, Videos," 2006, available at http://web.archive.org/web/20060614023608/http://fernsehserien.de/index.php?serie=9296. [Retrieved on Jun. 7, 2012], pp. 1-3.

European Search Report in European Application No. 08747228.8, dated Aug. 24, 2012, 4 pages.

European Office Action in European Application No. 08747228.8, dated Sep. 5, 2012, 6 pages.

* cited by examiner

MEDIA SEARCH BROADENING

TECHNICAL FIELD

This document discusses mechanisms and techniques for providing media-related responses to queries such as search engine queries.

BACKGROUND

We are blessed with masses of available information. Yet by a minor paradox, this wealth of information can prevent us from finding the actual information we need. Search engines like the Google search engine work hard to provide search results for information that is available over the internet, that are particularly relevant to their users.

One area, or vertical, in which people sometimes search for information on the internet is the media or entertainment industry—mainly television and movies, and more recently, videos such as those provided by YouTube. User's interests when looking for media can differ substantially from those when they are searching for items to purchase (e.g., using the Froogle service). For example, users may simply be interested in determining when episodes of a particular media program will be broadcast. In addition, they may be interested in finding additional programs in which their favorite actor or actress has appeared.

SUMMARY

This document describes mechanisms and techniques that may be employed to identify queries that are directed to finding media-related content. For example, a user may submit the name of a television program such as "Freaks and Geeks." The name alone may not produce many relevant results because the program was relatively short-lived and not popular. In addition, the person submitting the query may not be interested only in that particular program whether they know it or not. Instead, they might have a general interest in shows relating to young misfits, and could be open to results relating to other programs in a common genre, including shows like "Square Pegs" and perhaps even "Saved by the Bell." The mechanisms and techniques described here are directed to assisting in broadening a media-related query (and/or the results to that query) and displaying media-related results such as through a grouping of results (e.g., grouping by program title).

Such techniques may, in certain implementations, provide one or more advantages. For example, helping users identify and find other media-related programming that may be of interest to them. It may also be useful for targeting advertising to users of the system by helping to find a broader set of ads that may be of interest to the user.

In one implementation, a computer-implemented method is disclosed. The method includes receiving a search request at a central information provider, generating a query containing media-related terms relating to the search request, and submitting the query to a search engine having access to media-related search results, wherein the query is broader than the received search request, and transmitting media-related search results generated in response to the query by the search engine, to a remote device. The method may further comprise identifying one or more media-related terms in the search request that indicate that the request is media-related. Identifying the one or more media-related terms in the search request can include comparing words or word groups in the search request to a media-related whitelist. Also, identifying media-related terms in the query can include determining a distance between one or more terms and one or more terms in the machine learning system.

In some aspects, the generated query submitted to the search engine includes terms relating to words or word groups in the search request joined by open-ended Boolean connectors. In addition, the method can also include generating code for the display of one or more groupings of media-related search results and an electronic program guide grid showing at least one of the media-related search results. The search request can also be received from a general, non-media-specific, search engine page. In addition, generating the query can include supplying one or more words or word groups to a machine learning system that has been trained on media-related content. In some aspects, the machine learning system includes a graph relating media-related words or word groups by normalized scores. In yet other aspects, generating the query comprises submitting one or more words in the search request to a learning system to generate a context vector indicative of the one or more words' relationship to media-related words in a graph.

In another implementation, a computer-implemented method is disclosed. The method includes receiving from a user a search request and submitting the request to a central information provider, receiving in response to the request media-related results that were generated by submitting to a search engine a query containing media-related terms relating to the search request, wherein the query is broader than the search request, and generating a display of the search results and an associated electronic program guide grid containing at least one of the search results. The search request can be submitted to a general, non-media-specific, search engine page. Also, the response can be produced by generating supplying one or more words or word groups to a machine learning system that has been trained on media-related content. Moreover, the machine learning system can include a graph relating media-related words or word groups In yet another implementation, a computer-implemented system is disclosed that includes an interface programmed to receive search requests and to parse the search requests, a search engine having access to one or more media-related search result indices, and a query formatter to received the parsed requests from the interface and to add media-related terms to the parsed requests to generate queries that are broader than the search requests. The interface may be, in some aspects, further programmed to identify one or more media-related terms in the search request that indicate that the request is media-related. Also, the query formatter may be considered to pass an explicit media-related indicator to the search engine to cause the search engine to generate media-related search results.

In some aspects, the system further comprises a page formatter to generate code for the display of media-related search results responsive to the requests and electronic program guide grids showing media-related search results. The search requests can be received from a general, non-media-specific, search engine page. In addition, the system can include a machine learning system trained on media-related content that is configured to receive portions of the search requests and generate terms that are similar to the portions of he search request. In certain aspects, the machine learning system includes a graph relating media-related words or word groups by normalized scores.

The details of one or more embodiments are set forth in the accompanying drawings and the description below. Other features, objects, and advantages will be apparent from the description and drawings, and from the claims.

DESCRIPTION OF DRAWINGS

FIGS. 1A-1E show particular displays, including displays from FIG. 1

FIGS. 2A-2B show displays of media-related landing pages.

Like reference symbols in the various drawings indicate like elements.

DETAILED DESCRIPTION

Figure 1:
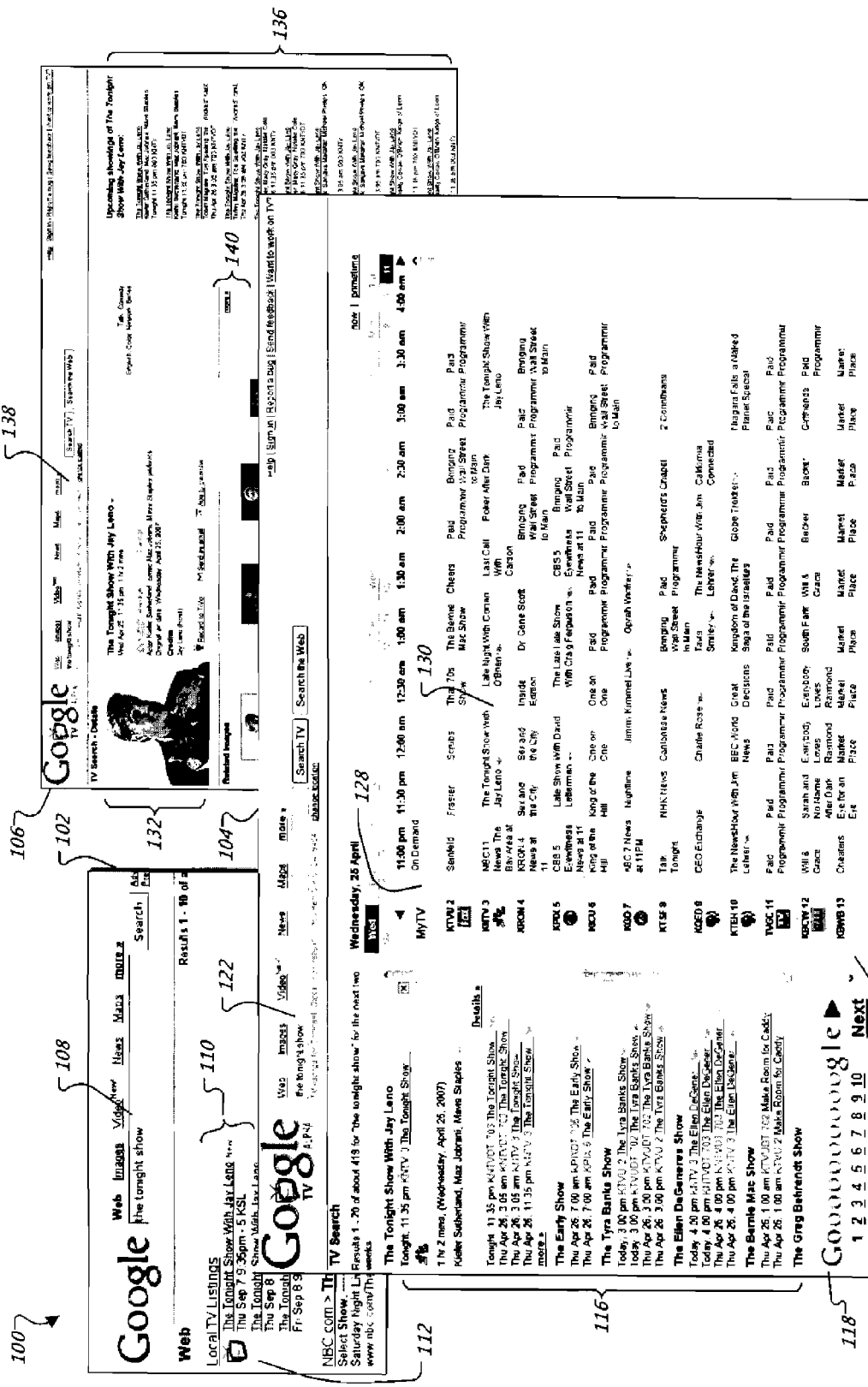
FIG. 1 shows displays illustrating interactions provided by an example program guide system.
Figure 1A:
Figure 1B:
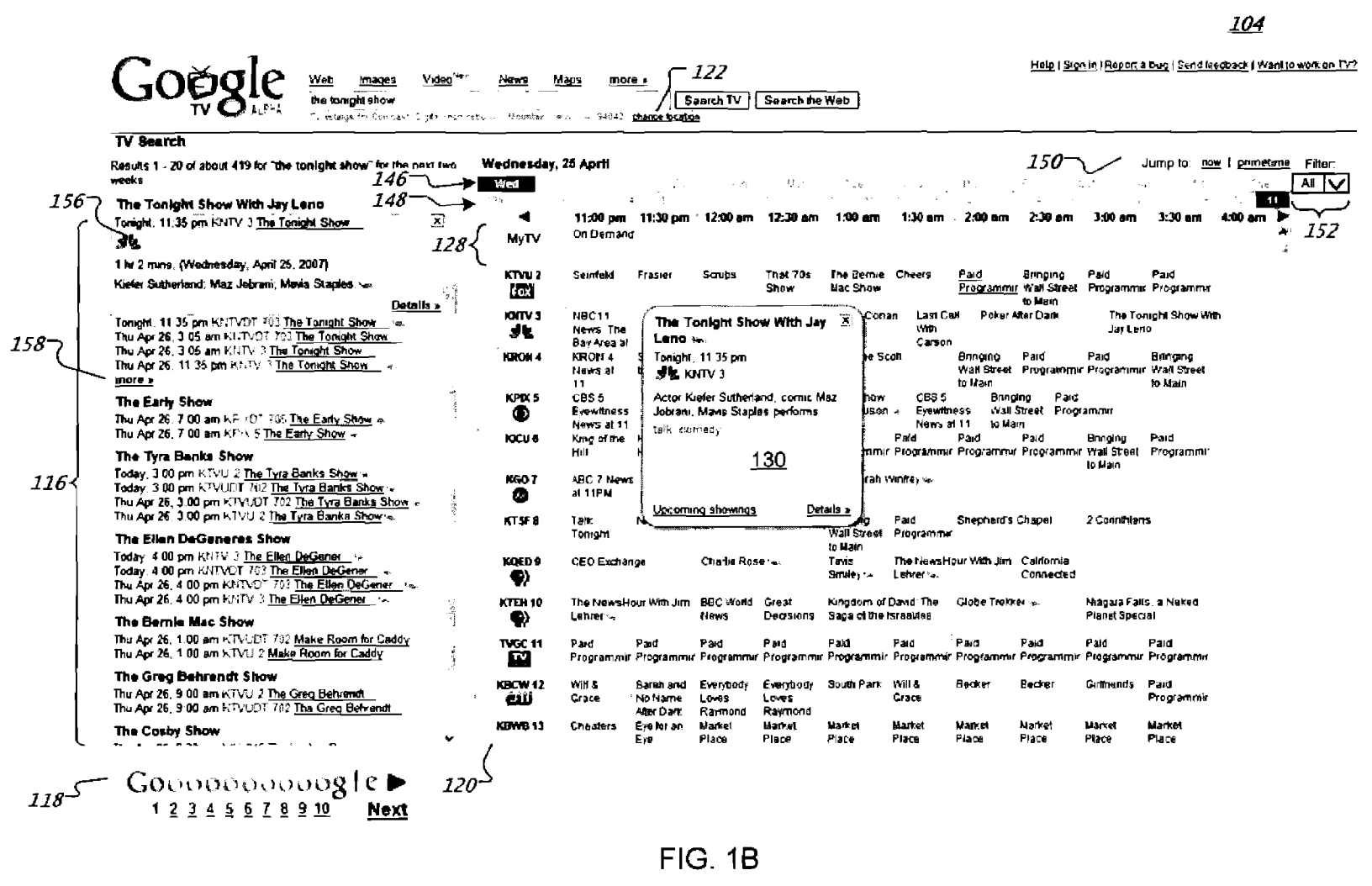
Figure 1C:
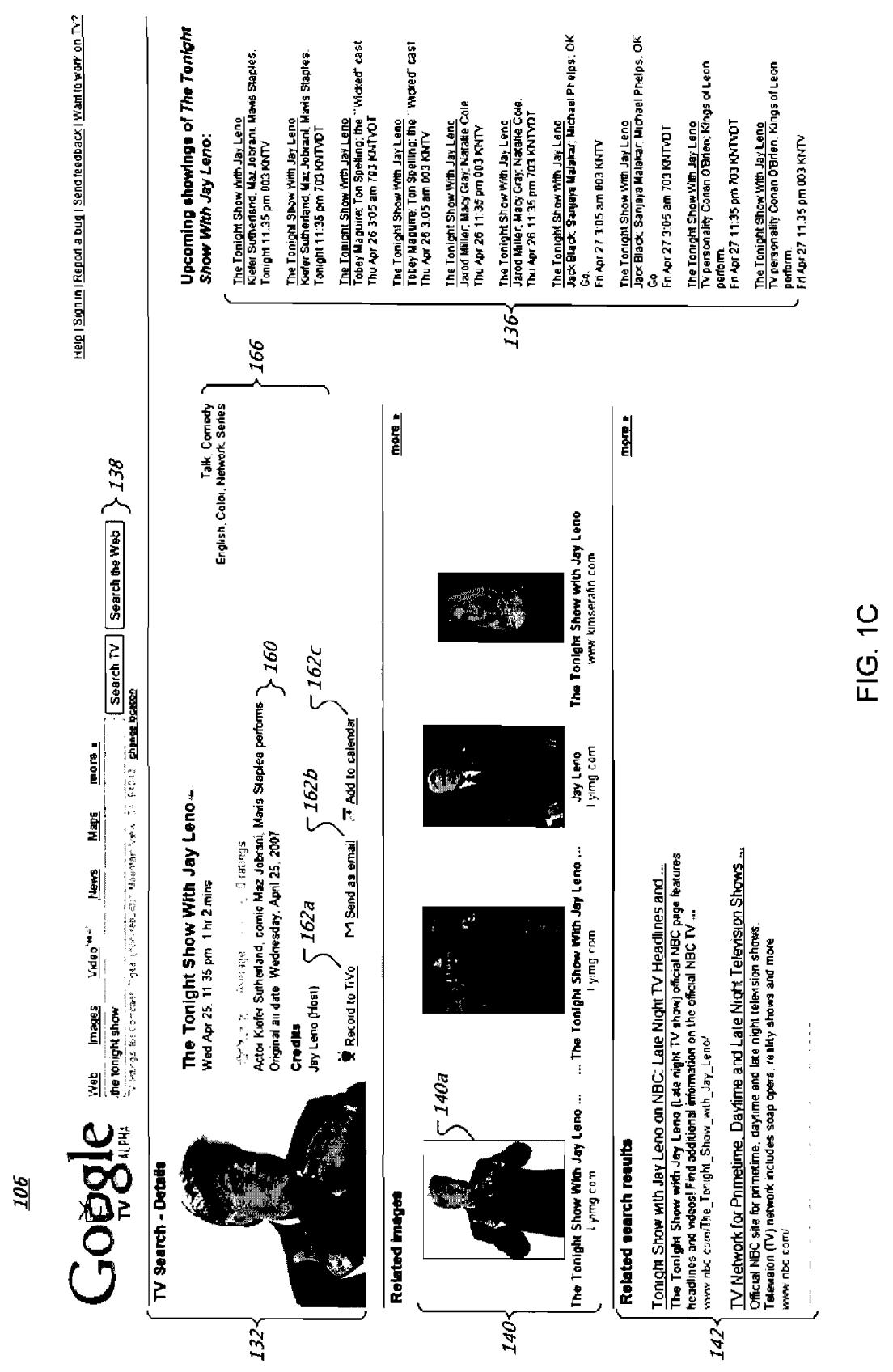

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as opposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, A user may select a program in the schedule grid 120, and may select a command to move it to the personalized channel 128 or may drag it to the personalized channel, among other things.

Also, one user may send a message to another user that identifies a particular program, such as by supplying a URL to a on line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner. The personalized channel 128 is described in more detail with respect to FIGS. 4A and 4B below.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a search details area 142. The search details area 142 may present the results of a search for web pages related to the program, such as a search result 142a. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140*a*.

The user may navigate to a web page related to the program by selecting a search result, such as the search result 142*a*, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

FIGS. 1A-1E show displays, including displays from FIG. 1, in more detail. FIG. 1A shows the search page 102. The search page 102 allows a user to search for web content using the search control 108. The program guide system 100 determines that the search term (e.g., "lost") may be a media program. For example, if the search term matches a media program name (such as a term stored in a "white list" of media-related terms) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "television." In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "lost." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of programs matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIGS. 2A and 2B.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program and left or right to a time associated with the program. This presents the program instance in the schedule grid 120. The schedule grid 120 may immediately present the selected program or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program.

Alternatively, the shading, coloring, or sizing may vary with the degree of separation between programs matching the search term and programs related to the matching programs. For example, a user may input a search term such as "Star Trek II: The Wrath of Kahn." Instances of the movie "Star Trek II: The Wrath of Kahn" in the schedule grid 120 may be highlighted with a first highlighting that is more significant than subsequent highlighting (e.g., a bright color (red for close hits moving to blue for further hits), dark shading, or large sizing). Instances of Star Trek movies other than "Star Trek II: The Wrath of Kahn" in the schedule grid 120, such as "Star Trek: The Motion Picture," "Star Trek III: The Search for Spock," "Star Trek IV: The Voyage Home," "Star Trek V: The Final Frontier," "Star Trek VI: The Undiscovered Country," "Star Trek: Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies). In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The groupings themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means, but when shown a photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval. The calendar control will be described in more detail with respect to FIG. 3.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their favorites channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A more control 158 indicates when more episodes or program instances exist that are not shown in the schedule entries 156. The more control 158 may also indicate how many more entries exist. A user may select the more control 158 to present the additional entries. In addition, a user may select the additional results control 118 to present additional groupings. The additional results control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off in half-hour increments.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program. The program details area 132 also includes information 166 associated with the program, such as an image from the program, the name of the series, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, using the search term or other information associated with the program.

The search details area 142 presents web pages and web page information associated with the program. The web pages are retrieved by performing a search, for example, of the Internet using the search term or other information associated with the program.

Figure 1D:
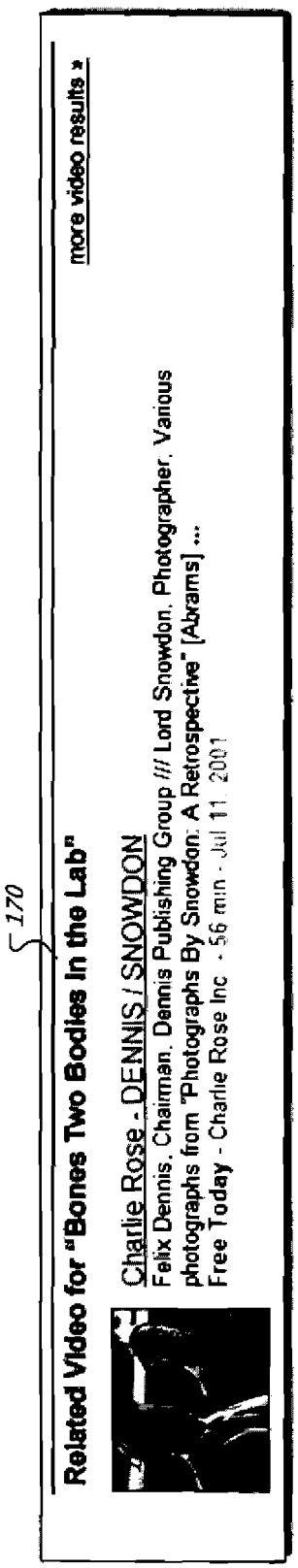

In addition, the details page 106 may include a video details area. FIG. 1D shows a video details area 170 that may be included in the details page 106. The video details area 170 may present a thumb nail image or sample frame or frames (e.g., a short clip) of the video and a link to where the video may be found. The video or videos associated with the program may be retrieved by performing a search, for example, of the Internet using the search term or other information associated with the program. The videos may include videos of other episodes of the program, or may include publicly made videos about the program, among other things. As one example, keywords may be associated with a program, either manually or by analysis of characteristics of the program and a transcript of the episode. Those keywords may be used to identify matching videos. For example, an episode of JAG may include extension discussions of carrier landings, so that video details area 170 for that episode includes results of videos showing spectacular carrier landings.

A user may select one of the images 140*a-d* and be directed to a web page where the image may be found. In addition, the user may select one of the web page links 142*a-c* to be directed to the web page where a reference to the program was found. In certain implementations, the user may input a rating and/or comment for the program. Other users may then view the rating (or a composite rating form multiple users) and/or comment provided by the user. In certain implementations, a user may customize the types of information presented in the details page 106, such as images, web pages, videos, or other media.

Figure 1E:
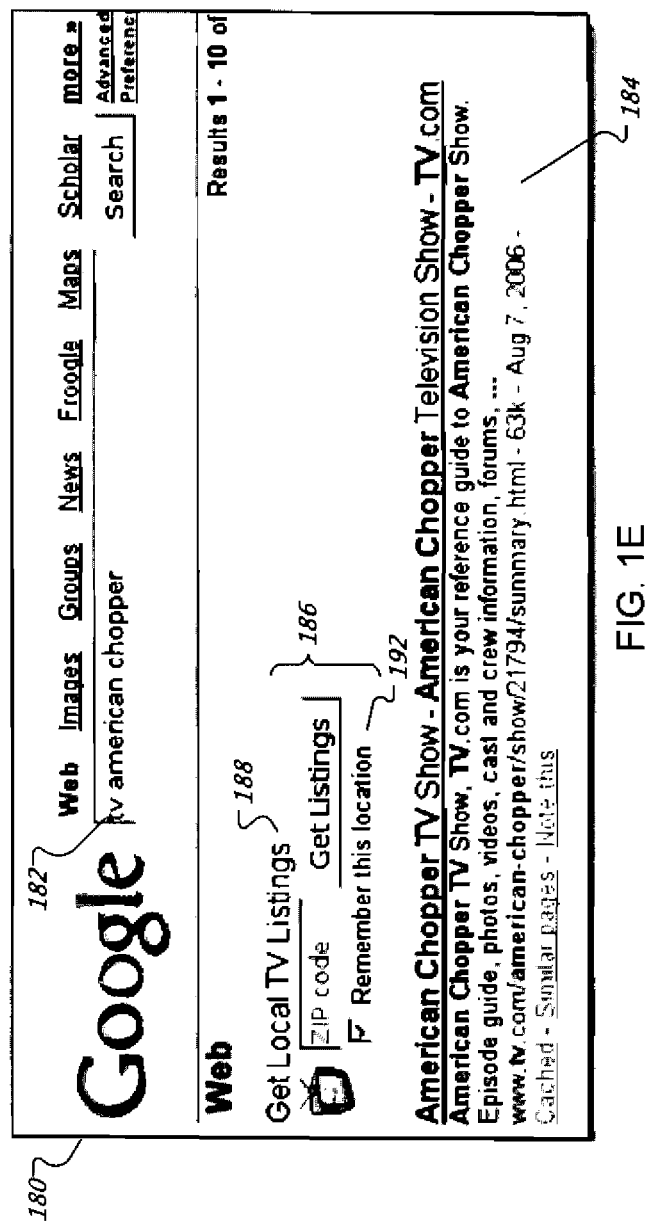

FIG. 1E shows a display 180 for resolving a head end and/or a zip-code and/or a location of a user of a program guide service. The display 180 is a web search page. The display 180 includes a search control 182 in which a user may input an Internet search term. A program guide service determines that the search term may be related to a media program. For example, the program guide service may recognize the search term as the name of a program or an episode of a program. Alternatively, the program guide service may recognize a keyword in the search term, such as "television," "TV," or "movie," indicating that the search term may be related to media programming.

In addition to web page search results 184, the program guide service can present media programming information in a media program information area 186. However, in order to determine the media providers, or head ends, accessible to or used by the user, the program guide service may request additional information from the user. The display 180 includes a location identification control 188. In this example, a ZIP code or postal code is requested from the user using the location identification control 188. In another example, other location identification may be used, such as a country, region (e.g., state or province), and/or city. The user may select a "Get Listings" control 190 to retrieve media program information associated with the search term in the search control 182 and available in the location specified in the location identification control 188. The display 180 also includes a "remember this location" control 192. If control 192 is selected, the user's location information may be stored, for example, in a database at a web server or in a cookie at a client device, and used in a subsequent media programming search.

Figure 2A:
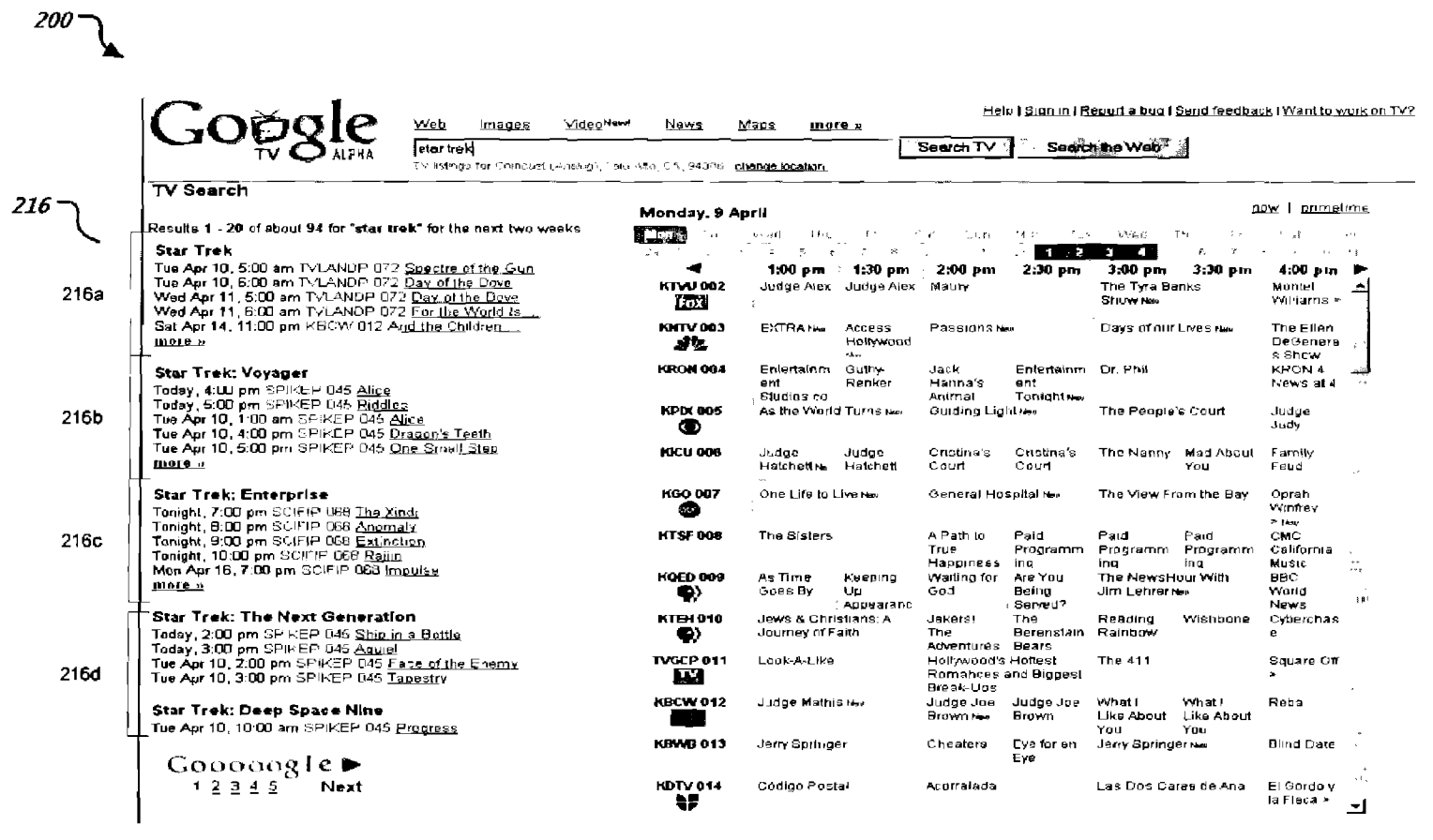
Figure 2B:

FIGS. 2A-2B show displays 200, 220 of media-related landing pages. The displays 200, 220 generally include the same features identified in FIG. 1B, such as a program guide grid that is tied to search results, a scheduling object (e.g., timeline) at the top of the grid for controlling the time period of media content being displayed, and a list of search result groupings 216. The focus in these two figures is on groupings 216, which in FIG. 2A are shown organized for a number of programs 216*a*-216*d*, including with broadcast times for each where applicable. The groupings 216 may be generated as a result of a search determined to be media-related. FIG. 2B shows the same display, but after a user has selected to expand out one of the groupings 216.

The groupings 216*a-d* in FIG. 2A may be identified in response to a query in a number of ways. In the example, the query was "star trek", so programs having "star trek" in their titles have been returned as a result of the query, and the various programs have had their episode grouped together. In other examples, one or none of the programs could relate directly to the query itself, but may be determined by broadening the search to include additional items such as other programs in a particular genre. For example, where the query is "freaks and geeks", grouping 216*a* may show episodes of the actually show Freaks and Geeks, while grouping 216*b* could show episodes of Square Pegs since it is a similar show from the same genre that might interest a searcher who is interested in Freaks and Geeks.

In FIG. 2B, the user has selected to see more of the base Star Trek grouping 216*a*. As a result, the grouping 216*a* has been expanded to include sixteen results for that program. To make room for the additional Star Trek results, a system may remove one or more of the groupings 216*b-d* that were previously displayed by the system in response to a query. Such expansion can occur by the user choosing a "more" control which causes the browser to execute a URL associated with the "more" control, and in turn causes a server to deliver mark up code for a page showing addition episodes in the grouping 216*a*. Alternatively, all of the episodes may have been provided initially, and a program associated with the browser may have displayed only a portion of the episodes; selection of the "more" control may cause the program to show the additional episodes. Likewise, selection of the "more" control may cause a get request to be sent to the server to obtain additional episodes, which may be delivered using, for example XML, and may be updated asynchronously without a need to refresh the display 200. Such an approach may utilize AJAX programming techniques.

Programs may be clustered using, for example, an explicit series identifier in the corpus of programming information, or a derived identification from other information about the program (e.g., the program title), and/or some combination thereof.

Although this particular example focuses on crowding of episodes among several example television programs, the displays 200, 220 can also provide access to various other kinds of media-related information. For example, the groupings 216*a-d* may also be organized by actor names, genres, producers, and other appropriate parameters on which to organize media-related content.

Figure 3:
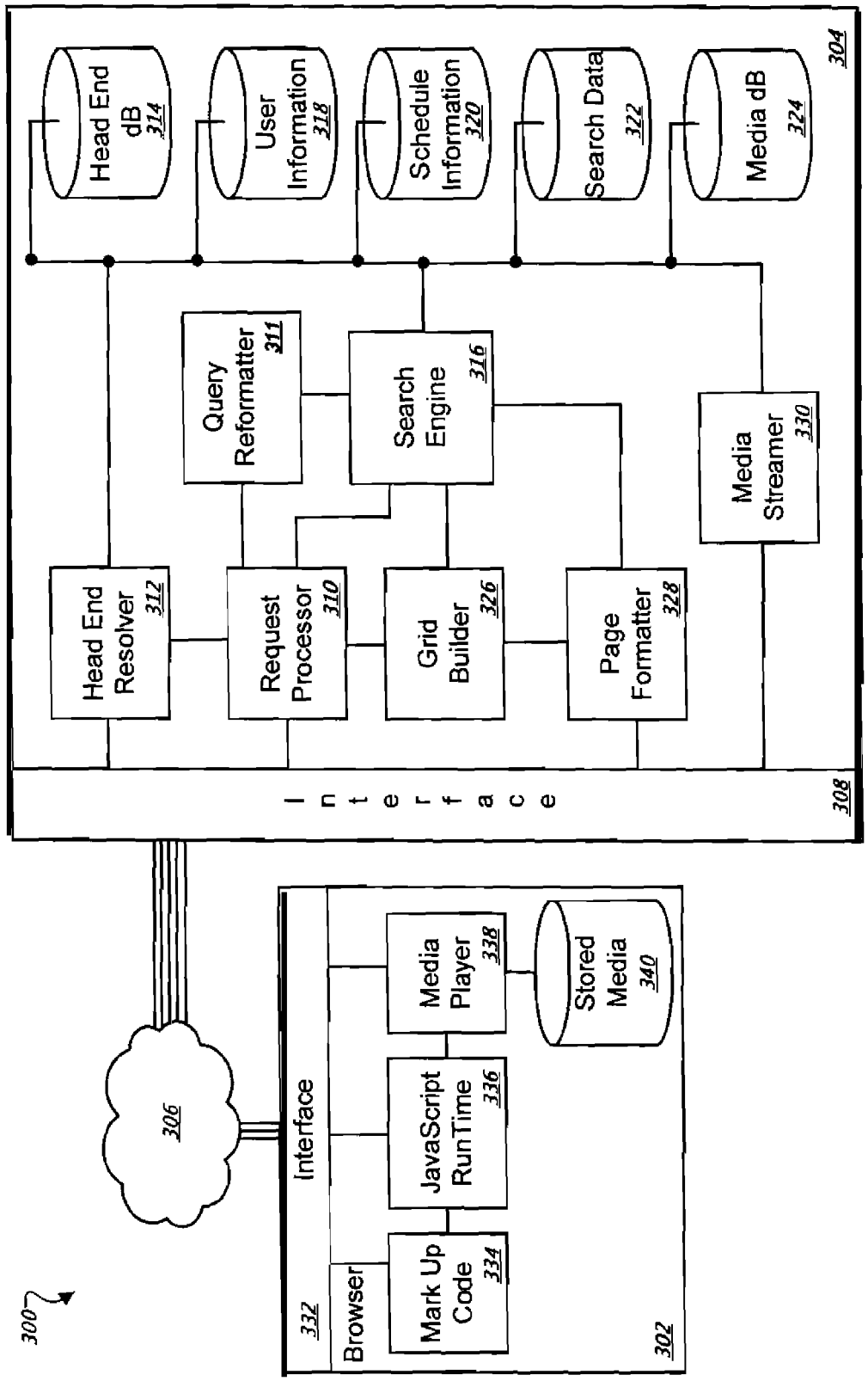
FIG. 3 is a schematic diagram of an example system for accessing media programming.

FIG. 3 is a schematic diagram of an example system 300 for accessing media programming. The system includes a client 302, a server 304, and a network 306 such as the internet connecting the two. The server 304 may communicate through an interface 308, which may itself include one or more web servers. Media-related requests from the client may be identified by the interface and routed to the request processor 310. The request processor 310 parses the requests into their constituent parts to determine the sort of information requested by the client 302. For example, if the request is a media-related search request, the request processor may pass the search terms to search engine 316, which may return one or more search results in a conventional manner. Also, the search engine 316 may return a media one box, like those described above, where the request is determined to be media related. Additional details about the operation of request processor, in performing parsing, are discussed below with respect to FIG. 4.

A query reformatter 311 may also be provided to examine queries or parts of queries submitted by users and, in appropriate circumstances, taken actions to have additional information be returned to the queries than would ordinarily be the case. As one example, the query reformatter may add additional terms to the query using a nonrestrictive "or" connector so that additional area of information are addressed by the query.

The additional terms may be selected to cause expansion of the query into areas related to the initial area. Selection of terms for such expansion generally involves identifying word, word groups, or concepts associated with words or words groups, that match corresponding words, word groups, or concepts in the query supplied by the user. Such selection may occur using a variety of mechanisms for identifying objects that are related to each other.

In one implementation, a learning system may be included in, or accessed by, reformatter 311. The learning system may be trained with information regarding words or word groups that have either a weak or strong relation to each other. Such training may create a map or grid of relationships, whose strength may be expressed, for example, by a normalized score between 0 and 1. When a media-related query is received by the system 300, and parsed by the request processor 310, the reformatter 311 may supply the query or parts of the query to the learning system and receive in response words or word groups determined to have a high degree of correlation to the words or word groups that were submitted from the query. The query reformatter 311 may then add one or more of these words or word groups to the received query before submitting the query to search engine 816.

The learning system can use dynamic search results to achieve a particular degree of accuracy with respect to the user's search query. In one implementation, the learning system may parse each query term, or groups of query terms, entered by the user, and perform a search on these individual parts. The results of those searches may return a number of returned documents that may be used to create a context vector for the original search query. The context vector may contain many words that tend to occur in context with the original search term(s), and that group of words may be compared with a measure, such as the a cosine coefficient, to determine the similarity between the original search query.

The learning system can provide enhanced search results in situations where the search terms have some level of ambiguity. For example, a search term "Miami Vice," (without quotes) applied to simple search engine can return results that include documents that pertain to the city of Miami, Fla., vice squads in general, or the 1980's television drama series. However the same search term applied to the learning system may return documents that contain the phrase "Don Johnson" or "television series" with a high level of occurrence. This may allow the learning system to determine that when the user entered the search term "Miami Vice," they were most likely searching for the documents pertaining to the television series, rather than the documents relating to Miami, Fla. or vice squads in general. The kernel function for providing such robust searching mechanisms is described in Sahami, M., Heilman, T. D. "A web-based kernel function for measuring the similarity of short text snippets." Proceedings of the 15th International Conference on World Wide Web (WWW 2006), pp. 377-386, and is incorporated in its entirety herein by reference.

Particular example processes for the reformatter 311 or other structures in system 300 that may operate to increase the range of results returned to a query, are described in more detail below with respect to FIGS. 4 and 5.

Other features of the system are carried out by the other pictured structures. For example, if a head end has not been associated with the client 302, a head end resolver 312 may be used to query the user for location information and other information (such as telecom provider) that may help in selecting a head end for the user with information stored in a head end database 314. A head end typically describes a particular source of programming for a user that is unique among various possible sources.

Where a user requests a landing page, grid builder 326 may provide code and generate data for display of media-related results, such as a grid of programs, at a particular date and time for a user. The grid builder 326 may receive signals, such as from search engine 316, regarding the position in the results that are to be displayed on the client 302. Media-related results information and search information may be provided to a page formatter 328, which may generate code for the display of pages like those shown in FIGS. 1A-1C and 5A-5D. User information 318 may, among other things, indicate a format for the display of a program guide grid, and page formatter 328 may generate code for displaying programming information in the appropriate format, such as the formats shown in FIGS. 1B, 1C, 2A, and 2B.

The page formatter 328 may also draw on other sources, such as image search results provided by search engine 316, and structured media data stored in media database 324. For example, relationships between and among actors and programs may be stored for display on a details page as shown above.

In some implementations, the media database 324 can include a whitelist database that stores queries, words, or word groups that have previously been determined to be media related. The whitelist database can be used to process a query so that it is handled as a media-related query, and a one box or other media-related result like those shown in FIGS. 1A-1C, may be generated and provided to a user. In particular, if the original query (or a portion or variation thereof) is stored in the whitelist, the system may assume, absent indications to the contrary, that the query is media related. Terms in a whitelist may also be weighted according to the strength of connection between the terms and media-related queries. For example, if a system has a set of data regarding a search term, and an understanding of which of the prior searches was media related (e.g., by the user selecting a media-related web site after receiving search results) or related to other subject matter, the weighting can reflect the general confidence that a later query will be media-related. For example, if the system has received 1000 queries for "lost," and 50 percent of the searchers click on a link to a fan site or network web site, while 50 percent went to an outdoors, orienteering, or other web site (such as a site associated with a book named "Lost") the media-related confidence factor for "lost" as a query or part of a query may be set at 0.5.

In determining whether a query is media related, such a score can be compared to scores for other categories. For instance, in the prior example, a term may be considered media-related evidence if its confidence is below 0.5, such as when the confidence for any other category of information is even lower. Of course, if the confidence is low enough, no assumptions of any kind might be made about the searcher's intent, and general search results may be returned, or the user may be prompted to identify which category, of multiple categories, interest them.

Other factors can also be used in addition to a score for a particular word or word set. For example, if multiple words or word sets appear on a media-related whitelist, the confidence that the query is media-related may be increased. Other factors may also be included in an overall confidence score or may act to trump factors that indicate a query is media related. Particular processes for determining whether a query is media related are described in more detail below with respect to FIGS. 4 and 5.

In addition to, or instead of, the use of whitelists and/or blacklists, other mechanisms may be used to determine the media-relatedness of a particular query. For example, a supervised machine learning system 842 may be trained using log data of past searches, associated with indications of whether the searches were media related or not. The system may use the teaching responses to generate a scoring mechanism or set of rules for determining whether other, future searches are media-related or not. Various mechanisms for such learning may be suitable.

Various databases may also be accessed by system 300. For example, user information database 318 may contain personalized information about users. Such information may include, for example, favorite channels of the user, the content of the user's personalized channel and other information that may be used to generate custom displays like those shown in FIGS. 1A-C. The data may be accessed, for example, in response to requests form JavaScript running on the client, and may be supplied via XML or other format for use in an asynchronous fashion. Also, schedule information 320 may be provided, such as to grid builder 326 for display of programming information.

Media streamer 330 may be used where streamlining media is provider by the system 300. The media streamer 330 may take any appropriate form and may be triggered based upon a display request from the client 302 when a particular program is set for display on the client 302.

Figure 4:
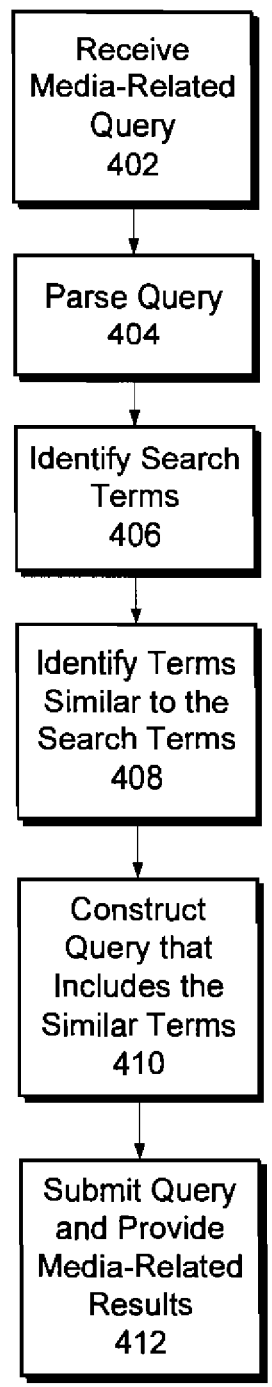
FIG. 4 is a flow chart of a process for broadening results returned from a media-related query.

FIG. 4 is a flow chart of a process 400 for broadening results returned from a media-related query. In general, the process locates word or word groups that are similar to those in a media-related query, and adds those word or word groups to the query, such as by expanding the provided query or by making multiple query submissions to a search engine (e.g., where one submission includes the user's submitted query and another includes a query generated by the system) and aggregating the results in manners like those discussed in the examples above.

The process 400 begins by the system receiving a media-related query. The query may initially be any sort of query, and may be submitted of the process 400 whether it has been determined to be media-related or not. In such a system, all queries may be considered candidates for broadening treatment, so that initial classification of the query is not needed. Alternatively, the query may first be analyzed to determine if it is media-related (e.g., by use of whitelists and blacklists, or by submission to a learning system that has been trained with known media-related data), before it is submitted for further processing. Such systems may be used where only media-related queries (and perhaps a relatively small set of other query types) are deemed to require broadening in the manner discussed here.

The system then parses the received query at box 404. The parsing may occur, for example, by breaking the query at each word or at each group of words, such as each pair of words, or tuple. For example, if the query is "The Tonight Show", word groups of "the tonight" and "tonight show" may be formed by the system. In this example, however, the system may initially remove common words such as articles, so that the only word group is "tonight show." Also, generally, the parsing may ignore capitalization, as shown for this example, but capitalization of a query may be taken into account when generating a score or other indicator of whether the query is media related. In particular, actor names and program names are generally capitalized, so that capitalization in a query may provide an indication that the query is media related—at least in comparison to a possible category of information that would not normally involve capitalization.

At box 406, the system identifies search terms in the query. Such identification may involve simply selecting the word or word groups produced in the parsing action. In addition, the identification may involve discarding certain words or word groups from the parsing, or selecting only particular words or word groups that will be submitted to a search engine.

At box 408, the system identifies words or word groups that are associated with the words or word groups identified from the query. Such identification of additional words or word groups may occur using the various mechanisms described above for the operation of reformatter 311 in FIG. 3. This process will generally return a list of additional words or word groups. The process may involve simply passing a request and a list of words or word groups to a dedicated system programmed to identify relationships between all sorts of words, word groups, and concepts. Such a system may have an API for programmers seeking to use it to receive various relatedness information, and the process 400 may operate according to the API.

When additional words or word groups are identified, the process may cause search results to be generated for all or part of the query submitted by a user, and all or part of the words or word groups suggested by the learning system, such as by constructing a query that adds the related words and word groups to the user-submitted query (box 410). Also, certain control words may also be added as explicit commands to a search engine, such as a prefix of "tv:". Such commands can instruct the search engine to limit the corpuses of information it searches, for example, to media-related corpuses. In such an example, the search engine can be a general search engine that may be shared by a number of services, including a media-related service.

At box 412, the reformatted query or new and user-submitted queries are provided to the search engine, which generates search results in response. The process may then format the search results in the manner discussed above for FIGS. 1A-C, or in other appropriate manners.

Although the various actions in this figure have been shown in a linear grouping as one example, the particular determinations made in the process and the order of those determinations may vary depending on the implementation.

Figure 5:
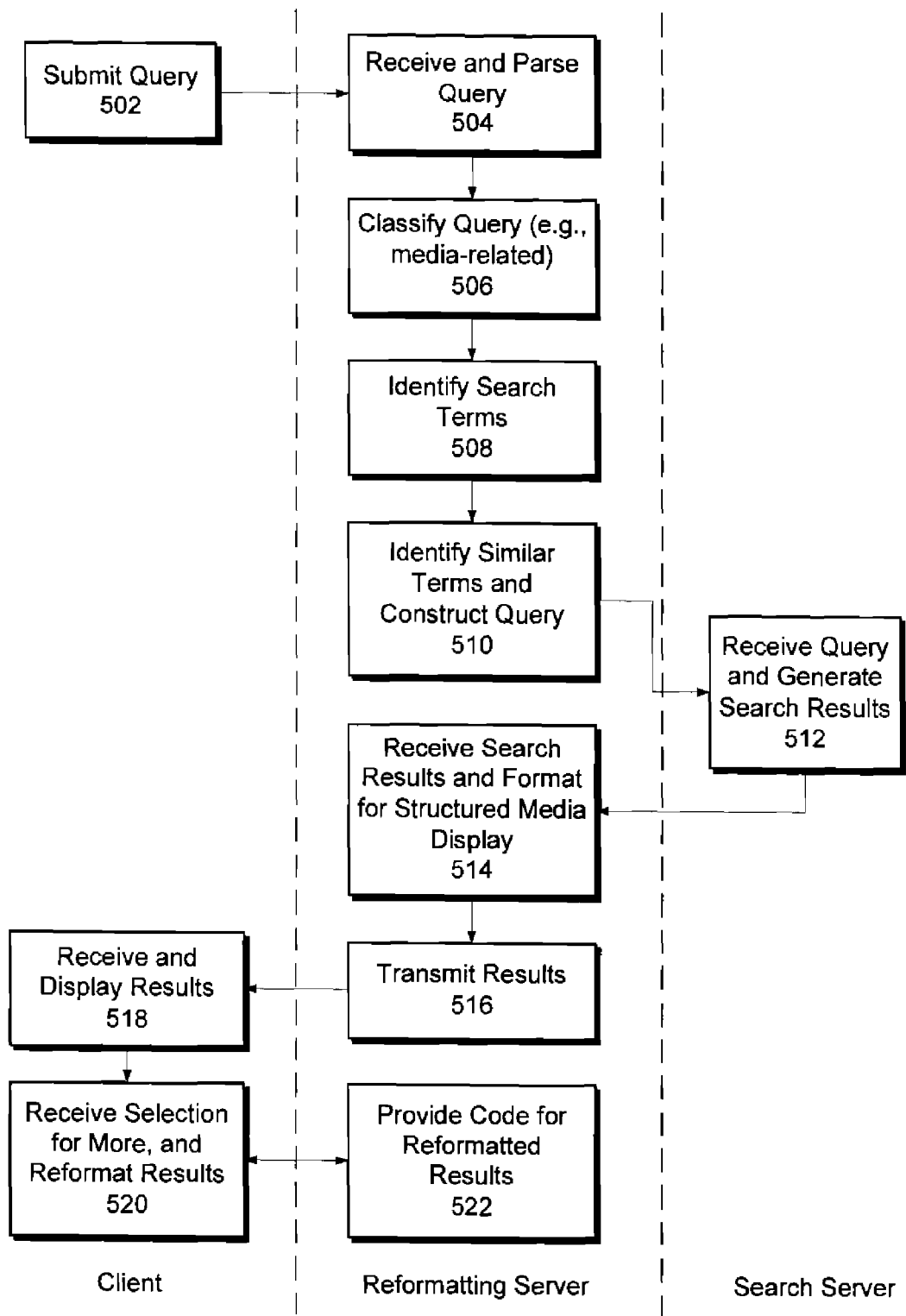
FIG. 5 is a swim lane diagram of a process for broadening results returned from a media-related query.

FIG. 5 is a swim lane diagram of a process for broadening results returned from a media-related query. At box 502, a client device submits a query, which may be in the form of a search request entered by a user of the device. A reformatting server, which may be part of an information provider such as Google, receives and parses the query (box 504) and then classifies the query. The classification may occur, for example, by comparing one or more words or word groups in the query with a whitelist of media-related words or word groups. The words or word groups in the query may also be submitted to a machine learning system, such as a system that has formed a graph or map of word and word group relationships by being trained with known media-related content. The distance between the words or word groups in the query and media-related words or word groups in the graph may be used as an indication of the media-relatedness of the query.

The reformatting server may then identify search terms in or associated with the query, and may then identify similar terms using techniques described herein. The search terms may include words that were in the submitted query or other terms. Such techniques for identifying similar terms may include identifying terms in the graph described above that are within a certain proximity to the identified search terms. The reformatting server may then submit the terms to a search server, such as by a concatenated "or" search so as to provide a broader search than would be achieved without the broadening operation. In addition, the reformatting server may add an indication to the query to indicate that it is media-related, such as a "tv" or "movie" prefix (box 510). Such an indication may cause the search engine to be biased toward returning media-related results, or may serve as a signal to the search engine to look only in indices associated with media-related content.

The reformatting server may then receive search results responsive to the query (boxes 512, 514) and may format the results for a media structured display. For example, the results may be formatted for displays like those shown in FIGS. 1A-1C. The formatting may include, for example, the generation of markup code including HTML and XML code for display on a remote client device. At box 516, the server transmits the results, and at box 518, the client receives and displays the results, such as in the form shown in FIGS. 1A-1C. At some later time, a user of the client device may seek to see more of one grouping of results (box 520), which may cause a request to be transmitted to the reformatting server and code for the additional results to be delivered and displayed (box 522). Such retrieval may occur, for example, via page reload or via a request as part of an AJAX programming technique.

Figure 6:
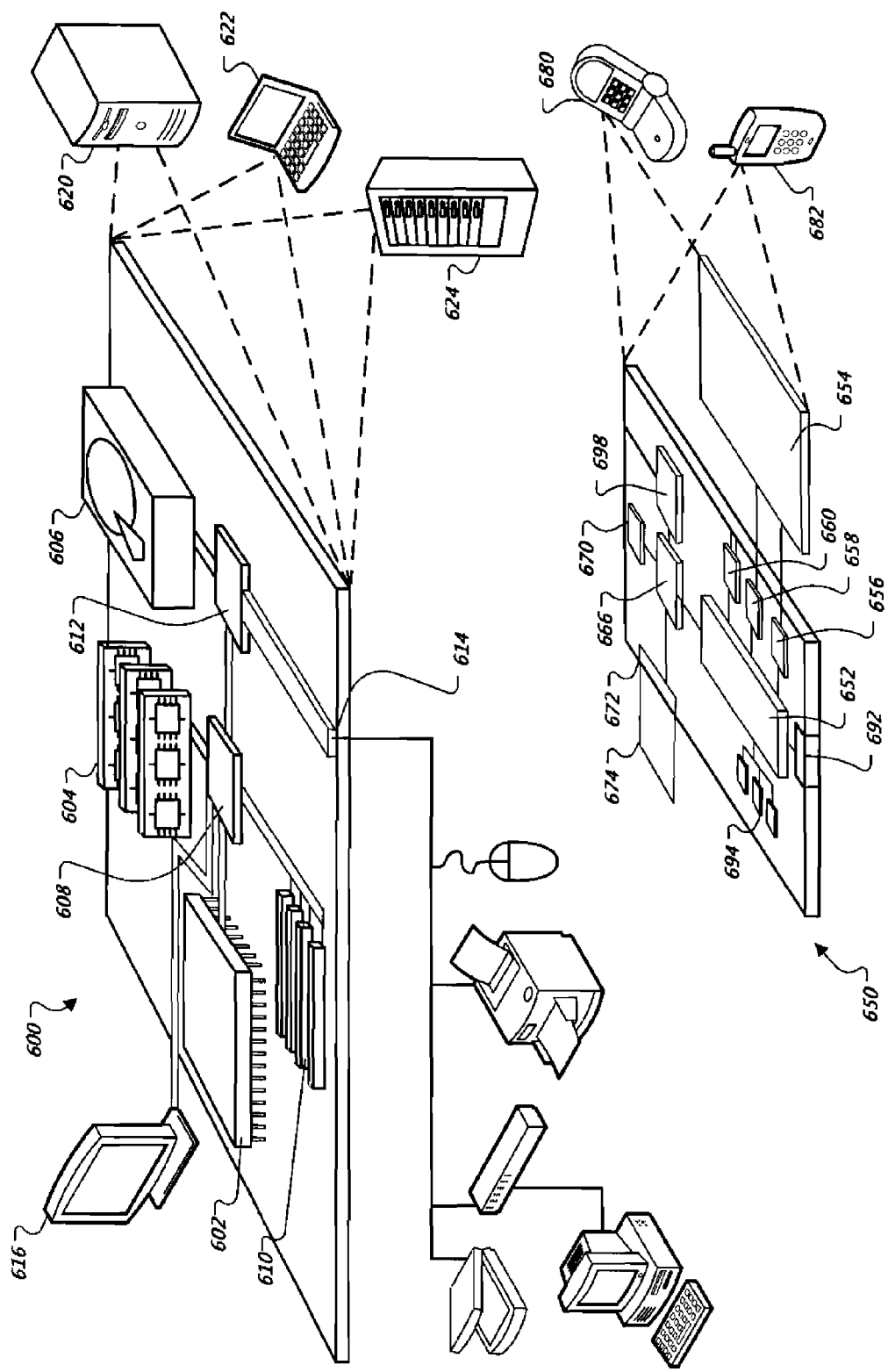
FIG. 6 shows an example of a computer device and a mobile computer device that can be used to implement the techniques described here.

FIG. 6 shows an example of a computer device 600 and a mobile computer device 650 that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Accordingly, other embodiments are within the scope of the following claims.

What is claimed is:

1. A computer-implemented method, comprising:
    receiving at a central information provider a search request input by a user;
    identifying one or more media-related terms in the search request that indicate that the search request is media-related and determining that the search request matches a first media-related category;
    identifying a second media-related category that is different from the first media-related category and is based on the first media-related category, and determining, based on the second media-related category, one or more additional media-related terms;
    in response to identifying the one or more media-related terms and the first and second media-related categories, and without receiving further input from the user about the search request, generating a query that is based on the search request and the one or more media-related terms in the search request and that additionally includes the one or more additional media-related terms that are not received from or selected by the user and that are related to the first and second media-related categories, and submitting the query to a search engine having access to media-related search results, wherein the query is broader than the received search request input by the user;
    in response to determining that one or more search results, responsive to the submitted query, is media-related, generating code for formatting a display for the one or more media-related search results, the display comprising a list area that is adjacent to an electronic program guide grid, wherein:
        (i) the list area displays (a) one or more icons that indicate that one or more search results is related to a television media program, (b) a media program identifier that identifies a name of a media program associated with one or more search results responsive to the submitted query, and (c) upcoming viewing times for one or more media programs associated with one or more search results responsive to the submitted query; and
        (ii) the electronic program guide grid displays at least one of the media-related search results; and
    transmitting the media-related search results, generated in response to the query by the search engine, to a remote device for presentation to the user in the generated format, wherein generating the query includes appending to the search request the one or more additional media-related terms.

2. The method of claim 1, wherein identifying the one or more media-related terms in the search request comprises comparing words or word groups in the search request to a media-related whitelist.

3. The method of claim 2, wherein identifying media-related terms in the search request comprises determining a distance between one or more terms in the search request and one or more terms in a graph of word and word group relationships in a machine learning system.

4. The method of claim 1, wherein the generated query submitted to the search engine includes terms relating to words or word groups in the search request joined by open-ended Boolean connectors.

5. The method of claim 1, wherein the search request is input by the user at and received from a general, non-media-specific, search engine page.

6. The method of claim 1, wherein generating the query comprises supplying one or more words or word groups to a machine learning system that has been trained on media-related content.

7. The method of claim 6, wherein the machine learning system includes a graph relating media-related words or word groups by normalized scores.

8. The method of claim 7, wherein generating the query comprises submitting one or more words included in the search request to a learning system to generate a context vector indicative of a relationship between the one or more words and media-related words in the graph.

9. A computer-implemented method, comprising:
    receiving from a user a search request and submitting the search request to a central information provider;
    identifying one or more media-related terms in the search request that indicate that the search request is media-related and determining that the search request matches a first media-related category;
    identifying a second media-related category that is different from the first media-related category and is based on the first media-related category, and determining, based on the second media-related category, one or more additional media-related terms;
    receiving in response to the search request media-related results that were generated by submitting a query to a search engine, wherein the query included one or more media-related terms that were not received from or selected by the user and that are based on the search request and that are related to the first and second media-related categories and was broader than the search request received from the user;
    generating code for formatting a display for one or more media-related search results, the format comprising a list area that is adjacent to an electronic program guide grid, wherein:
        (i) the list area displays (a) one or more icons that indicate that one or more search results is related to a television media program, (b) a media program identifier that identifies a name of a media program associated with one or more search results responsive to the submitted search request, and (c) upcoming viewing times for one or more media programs associated with one or more search results responsive to the submitted search request; and
        (ii) the electronic program guide grid displays at least one of the media-related search results; and
    generating a display of the search results in the generated format.

10. The method of claim 9, wherein the search request is submitted to a general, non-media-specific, search engine page.

11. The method of claim 9, wherein the response is produced by supplying one or more words or word groups to a machine learning system that has been trained on media-related content.

12. The method of claim 11, wherein the machine learning system includes a graph relating media-related words or word groups.

13. A computer-implemented system, comprising one or more computing devices including:
- an interface programmed to receive search requests and to parse the search requests and to (i) identify one or more media-related terms in the search requests that indicate that the search requests are media-related, (ii) determine that the search request matches a first media-related category, (iii) identify a second media-related category that is different from the first media-related category and is based on the first media-related category, and (iv) determine, based on the second media-related category, one or more additional media-related terms, and (v) generate code for formatting a display for the one or more media-related search results, the display comprising a list area that is adjacent to an electronic program guide grid, wherein the list area displays (a) one or more icons that indicate that one or more search results is related to a television media program, (b) a media program identifier that identifies a name of a media program associated with one or more search results responsive to the submitted query, and (c) upcoming viewing times for one or more media programs associated with one or more search results responsive to the submitted query and the electronic program guide grid displays at least one of the media-related search results;
- a search engine having access to one or more media-related search result indices; and
- a query formatter to receive the parsed requests from the interface and, in response to parsed requests being identified as media-related, to add one or more additional media-related terms to the parsed requests to generate queries that are broader than the search requests, wherein the one or more media-related terms added to the parsed requests are related to the first and second media-related categories and were not included in the received search requests or selected by users that submitted the search requests.

14. The system of claim 13, wherein the query formatter is configured to pass an explicit media-related indicator to the search engine to cause the search engine to generate media-related search results.

15. The system of claim 13, further comprising a page formatter to generate code for the display of media-related search results responsive to the requests and electronic program guide grids showing media-related search results.

16. The method of claim 13, wherein the search request is received from a general, non-media-specific, search engine page.

17. The system of claim 13, further comprising a machine learning system trained on media-related content that is configured to receive portions of the search requests and generate terms that are similar to the portions of the search requests.

18. The system of claim 17, wherein the machine learning system includes a graph relating media-related words or word groups by normalized scores.

\* \* \* \* \*

UNITED STATES PATENT AND TRADEMARK OFFICE
CERTIFICATE OF CORRECTION

| | | |
|---|---|---|
| PATENT NO. | : 8,484,192 B1 | Page 1 of 1 |
| APPLICATION NO. | : 11/742382 | |
| DATED | : July 9, 2013 | |
| INVENTOR(S) | : Sahami et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this
Twenty-seventh Day of January, 2015

Michelle K. Lee
*Deputy Director of the United States Patent and Trademark Office*